3,071,485
HEAT-SEALABLE, WATER-ACTIVATABLE STARCH FILMS
Otto B. Wurzburg, Whitehouse Station, and William Herbst, North Plainfield, N.J., assignors to National Starch and Chemical Corporation, New York, N.Y., a corporation of Delaware
No Drawing. Filed Jan. 19, 1960, Ser. No. 3,237
9 Claims. (Cl. 106—213)

This invention relates to starch films characterized by a unique combination of properties, namely the ability to be activated to an adhesive state by heat as well as by water, and to a method for preparing such films.

It is an object of our invention to provide heat-sealable, water-activatable, self-supporting starch films for use in the production of bags, pouches, envelopes and other forms of packages, wherein heat-sealing or water moistening offers a convenient means of closure. It is our further object to provide greaseproof, non-toxic, flexible coatings on substrates such as paper, chipboard and cupstock, by means of our novel starch films.

Although it has been known to prepare starch films, either in a self-supported state or as coatings upon a substrate, it has never been possible to employ such films in heat-sealing applications. Heat-sealing, as is known in the art, provides a means for sealing a material, particularly a film, to a similar or dissimilar material, by the mere application of heat and mild pressure. The ability of a substance to be heat-sealed is a function of its thermoplasticity. Thus, if a substance is thermoplastic it will, upon being heated, soften and tackify, i.e. become sticky and adhesive, to a degree where it may be readily bonded to another surface so as to form a relatively permanent bond upon cooling. It has not heretofore been possible to introduce such thermoplastic properties into starch films on a commercially feasible basis. As can be readily observed by simple experimentation, any attempt to heat an ordinary starch film of the type heretofore known merely causes it to become extremely brittle, rather than tacky and adhesive.

Thus, any adhesive applications for starch films, including self-supporting films, have thus far been limited to a utilization of their water-activatable properties. Upon being moistened, some starch films are activated to a point where they soften and tackify. This property permits these films to be used as water activated adhesive coatings. However, there are many disadvantages inherent even in these coatings which have limited their utility. Particularly important is the tendency of these coatings to crack and become discontinuous especially when the substrate to which they have been adhered is subjected to the stress of folding or bending. This cracking often eliminates any advantages which the presence of these films may have originally provided, as, for instance, in the case of grease-proof coatings.

We have now discovered a method for making heat-sealable, self-supporting starch films which are unique in that they may also be used to prepare water activatable adhesive coatings which are especially noteworthy for their high degree of flexibility and excellent resistance to cracking.

In essence, our invention comprises the preparation of heat-sealable films from aqueous dispersions containing starch admixed with from 50 to 100% of sorbitol, as based on the weight of said starch. The sorbitol used in preparing these dispersions may be in any of the commercially available forms, including the crystalline powder, syrups and aqueous solutions.

In another variation of our invention, the practitioner may use mixtures of glycerin and sorbitol wherein these mixtures are again employed in concentrations ranging from 50 to 100% by weight of the starch present in the dispersion. These mixtures should contain at least 10% by weight, of sorbitol; however, we prefer to use a 1:1 blend of these two reagents.

As used in this invention, the term "starch" includes any amylaceous substance such as untreated starch as well as starch derivatives including dextrinized, hydrolyzed, oxidized, esterified and etherified starches still retaining amylaceous material. These starches may be derived from any sources including corn, wheat, potato, tapioca, waxy maize, sago or rice.

In practice, the starch films of our invention are ordinarily prepared by dispersing the requisite amounts of starch with sorbitol, or with sorbitol-glycerine blends, in approximately 100–1200 parts of water per 100 parts of starch, whereupon this mixture is then heated for 15 to 20 minutes at a temperature of from 90–100° C. This heat, of course, gelatinizes and disperses the starch and if a self-supporting film is desired, the resulting hot paste may then be cast, to any desired thickness, upon a suitable flat surface. After drying, the film, which may be of any length or width, is stripped from the casting surface and can be wound upon a spool or rod until such time as it is to be used.

These self-supporting films may be converted into numerous types of package forms such as pouches and envelopes, etc., which may then be filled with any of a wide variety of materials such as dyes, bleaches, detergents, soaps and food products. The edges of these package forms are readily heat-sealed using commercially available heat-sealing apparatus which can be set to operate at a pressure of from 8 to 35 pounds per square inch, a temperature of from 135°–190° C., and a dwell time of about one second (dwell time refers to the time of contact between the heat sealing apparatus and the film).

In addition to utilizing the novel heat-sealability and water sensitivity of our self-supporting films in the production of package forms, it is also possible to employ this same property in the preparation of laminations or coatings which are derived from these films and which are adhered to the desired substrates, e.g. paper, cloth, leather, paperboard, etc. Adhesion may be effected either by the use of heat or moisture, whichever is more convenient. The practitioner is thus able to utilize either the heat-sealability or water activatable characteristics of our self-supporting starch films when using the latter in the preparation of coatings and laminations.

In still another variation of our process, it is possible to prepare such laminations and coatings by the direct casting of the aqueous starch-sorbitol, or starch-sorbitol-glycerine, dispersion onto the surface of the subtrate material. In any case, whether one prepares these laminations by the heat-sealing or moisture activated adhesive application of the self-supporting starch film to the substrate or by the direct casting of the starch-sorbitol or starch-sorbitol-glycerine dispersion onto the substrate, the ultimate results are equivalent. One always obtains a coating which may be flexed at much as 180° without any danger of cracking. Such films thus provide excellent greaseproof coatings which, as a result of their non-toxic character, find extensive application as coatings for food packaging materials.

The following examples will more clearly illustrate the embodiment of this invention. In these examples all parts given are by weight unless otherwise noted.

*Example I*

This example illustrates the preparation and use of the heat-sealable, self-supporting films of our invention. In this example there is first described the preparation of a number of different films, wherein the use of various types of starches and starch derivatives is demonstrated, and where variations are also made in the sorbitol concentration of these films.

This procedure involved the initial addition of the requisite amount of sorbitol, together with 100 parts of the particular starch being employed, to 1000 parts of water. Dispersion was effected by heating these mixtures for 20 minutes, with agitation, at a temperature of 90° C. and, in each case, the resulting hot pastes were cast onto polytetrafluoroethylene coated stainless steel plates. After drying for 16 hours at 25° C., the films were stripped from these plates and then wound on cardboard spools where they were maintained until such time as they were to be used. The dry thickness of these films was varied between 1.5 and 5.0 mils. The following table indicates the types of starch and the sorbitol concentration used in each of the various films which were prepared.

| Film Number | Type of Starch | Sorbitol Concentration (Percent Sorbitol on wt. of starch) |
|---|---|---|
| 1 | corn starch | 50 |
| 2 | do | 75 |
| 3 | do | 100 |
| 4 | corn dextrin | 60 |
| 5 | chlorinated corn starch | 80 |
| 6 | waxy maize starch | 90 |
| 7 | potato starch | 55 |
| 8 | tapioca starch | 95 |
| 9 | tertiary amino alkyl ether of corn starch [1] | 50 |
| 10 | carboxymethyl ether of corn starch [2] | 70 |
| 11 | acetate ester of corn starch [3] | 100 |
| 12 | phosphate ester of corn starch [4] | 85 |

[1] Prepared according to the procedure described in Example I of U.S. Patent No. 2,813,093.
[2] Prepared according to the procedure described in Example I of U.S. Patent No. 2,802,000.
[3] Prepared according to the procedure described in Example I of U.S. Patent No. 2,461,139.
[4] Prepared by reacting corn starch with an aqueous solution comprising sodium monohydrogen phosphate and sodium dihydrogen phosphate.

All of the above described films were heat-sealed so as to form envelopes or pouches. Thus, for example, a 6" x 3" sheet of film #2 was folded in half, lengthwise, and its vertical edges bonded using a Sentinel heat sealer unit, manufactured by Packaging Industries of Montclair, N.J. This machine was operated at a temperature of 149° C., a jaw pressure of 12 p.s.i., and dwell time of one second. The resulting open ended pouch was then filled with a synthetic laundry detergent whereupon it was sealed using the Sentinel heat sealer under the same conditions as described above.

To further demonstrate the heat-sealable characteristics of the starch films of our invention, a 9" x 12" sheet of the film #5 was heat-sealed to a paperboard sheet of the same dimensions by passing the heated board and the film together through steel pressure rollers. The resulting coating was greaseproof and could be flexed as much as 180° without showing any signs of cracking or other distortion.

In order to illustrate the use of our self-supporting films as water activated adhesive coatings, a 9" x 12" sheet of film #10 was moistened on one surface and this surface was then adhered to a paperboard sheet of the same dimensions. The resulting coating was greaseproof and could be flexed as much as 180° without showing any signs of cracking or other distortion. Similar water activated coatings were also prepared from the other films described in the above table.

*Example II*

This example illustrates the preparation of greaseproof paper coatings by the direct casting of our aqueous starch-sorbitol dispersions.

A dispersion was prepared by heating a mixture of 75 parts of sorbitol, 100 parts of corn starch and 1000 parts of water for 20 minutes at a temperature of 95° C. The hot paste was then cast directly onto a paper sheet and, using a Gardner film casting knife, a 25 mil wet film was deposited. After drying for 16 hours at 25° C., the resulting coating could be flexed as much as 180° without showing any signs of cracking or other distortion. The coating was also greaseproof. Other types of starches and starch derivatives were similarly cast directly onto various substrates including cupstock and chipboard.

*Example III*

This example illustrates the attempted preparation of heat-sealable, self-supporting starch films which did not contain sorbitol and also wherein the sorbitol concentration was outside of the previously stated acceptable range.

There aqueous starch dispersions were prepared. Dispersion #1 contained 100 parts of corn starch and 1200 parts of water. Dispersion #2 contained 100 parts of corn starch, 1200 parts of water and 40 parts of sorbitol. And, dispersion #3 contained 100 parts of corn starch, 1200 parts of water and 110 parts of sorbitol. Each of these dispersions was heated for 20 minutes at 95° C., cast onto polytetrafluoroethylene coated steel plates and dried for 16 hours at 25° C. The resulting films were then evaluated.

The films derived from both dispersions #1 and 2 were removed from the steel plate but could not be heat-sealed using the same apparatus and conditions as described in Example I. In both cases adhesion was not achieved and the films became embrittled. The film derived from dispersion #3 was found to be extremely soft and could not, in fact, be removed from the steel plate without causing considerable damage, i.e. tearing, to it. In addition, there was an appreciable degree of "blooming" observable on the film. Blooming refers to an undesirable condition in certain areas of the film wherein there is an apparent crystallization, or migration, of the sorbitol to the film surface.

These results indicate the criticality involved in using sorbitol in quantities falling within the operable range required by the process of our invention.

*Example IV*

This example illustrates the preparation of heat-sealable, self-supporting starch films using sorbitol-glycerine mixtures rather than sorbitol alone as was the case in Examples I and II.

This procedure involved the initial addition of 75 parts of a 1:1 sorbitol-glycerine mixture, together with 100 parts of corn starch, to 1000 parts of water. Dispersion was effected by heating this mixture for 20 minutes, with agitation, at a temperature of 90° C. whereupon the resulting hot paste was cast onto a polytetrafluoroethylene coated stainless steel plate. After drying for 16 hours at 25° C., the film was stripped from the plate and wound on a cardboard spool where it was maintained until such time as it was to be used. Similar films were prepared wherein the ratio of sorbitol to glycerine within the mixture was set at 9:1 and 1:9, respectively. The concentration of these mixtures was also varied to 50 and 100%, respectively, as based on the weight of the starch present in the dispersion. Additional films were also prepared using the various starches and starch derivatives described in Example I.

All of these films, as prepared with sorbitol-glycerine mixtures, were used in the various applications described in Example I, i.e. preparing heat-sealed pouches, heat-sealed coatings, and water activated coatings. The dispersions of these mixtures were also utilized in the preparation of paper coatings by means of the direct casting procedure described in Example II.

Summarizing, our invention is thus seen to provide a procedure for preparing self-supporting starch films which are unique in that they may be heat-sealed as well as water activated. These versatile films may be used in the preparation of a wide variety of coatings and packages. Variations may be made in procedures, proportions and

We claim:

1. The process of preparing heat-sealable and water-activatable starch films comprising heating a mixture of water and a water dispersible starch at a temperature sufficient to gelatinize and thereby disperse said starch, said mixture containing, as essentially the only other ingredient thereof, a sorbitol product selected from the class consisting of sorbitol and a mixture of sorbitol and glycerine, the proportion of the sorbitol product being in the range of from 50% to 100% by weight of the starch in the dispersion, and casting said dispersion onto a surface and permitting it to dry.

2. The process of claim 1 in which the said sorbitol is in a mixture of sorbitol and glycerine in the proportion of 50% to 100% by weight of the starch in the dispersion, and in which the amount of sorbitol is at least 10% of the weight of the sorbitol-glycerine mixture.

3. The process of claim 1 in which the sorbitol product is a 1:1 by weight sorbitol-glycerine mixture.

4. The process of claim 1 wherein the starch is selected from the class consisting of untreated, dextrinized, hydrolyzed, oxidized, esterified and etherified starches still retaining amylaceous material.

5. The process of claim 1 in which the film is formed as a self-supporting film by casting the dispersion on a surface, drying the resulting film and removing said film from the surface.

6. A heat-sealable and water-activatable starch film comprising a dried dispersion of water dispersible, gelatinized starch in water containing as essentially the only other ingredient a sorbitol product, said sorbitol product selected from the class consisting of sorbitol and a mixture of sorbitol and glycerine, the proportion of the sorbitol product being in the range from 50% to 100% by weight of the starch.

7. The heat-sealable and water-activatable starch film of claim 6 in which the said sorbitol is in a mixture of sorbitol and glycerine in the proportion of 50% to 100% by weight of the starch in the dispersion, and in which the amount of sorbitol is at least 10% of the weight of the sorbitol-glycerine mixture.

8. The heat-sealable and water-activatable starch film of claim 6 in which the sorbitol product is a 1:1 by weight sorbitol-glycerine mixture.

9. The heat-sealable and water-activatable starch film of claim 6 in which the film comprises a flexible, greaseproof coating of a surface of a substrate material.

References Cited in the file of this patent

UNITED STATES PATENTS

| | | |
|---|---|---|
| 2,883,300 | Rickert | Apr. 21, 1959 |
| 2,988,455 | Rosenberg et al. | June 13, 1961 |

FOREIGN PATENTS

| | | |
|---|---|---|
| 635,274 | Great Britain | Apr. 5, 1950 |

OTHER REFERENCES

Kerr: Chemistry and Industry of Starch, 2nd edition, Academic Press, Inc., New York, 1950, page 621.